(No Model.)
L. M. LITTLEFIELD.
CHURN DASHER.
No. 407,672. Patented July 23, 1889.
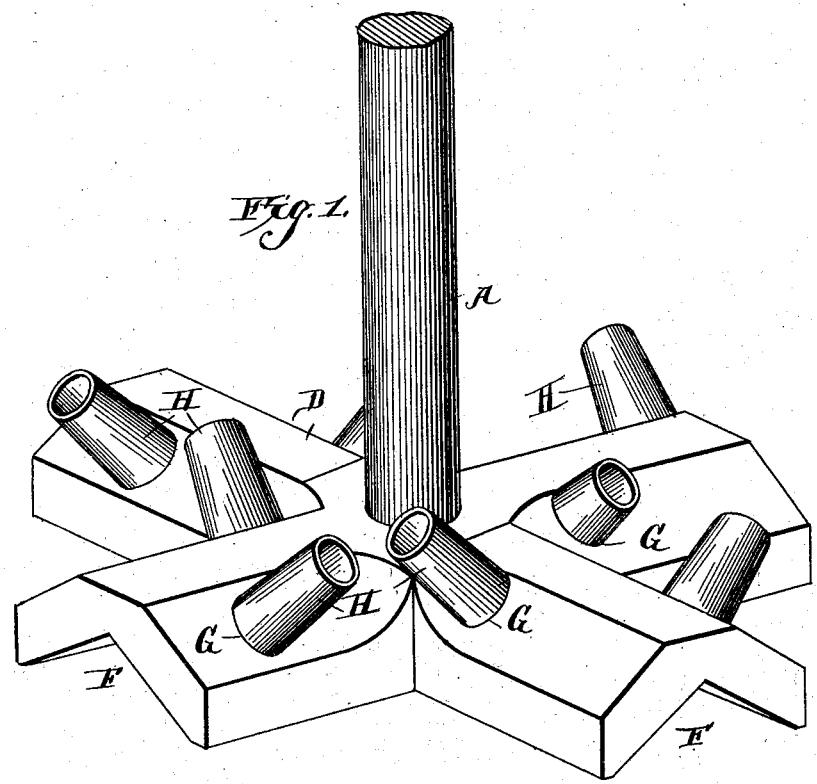
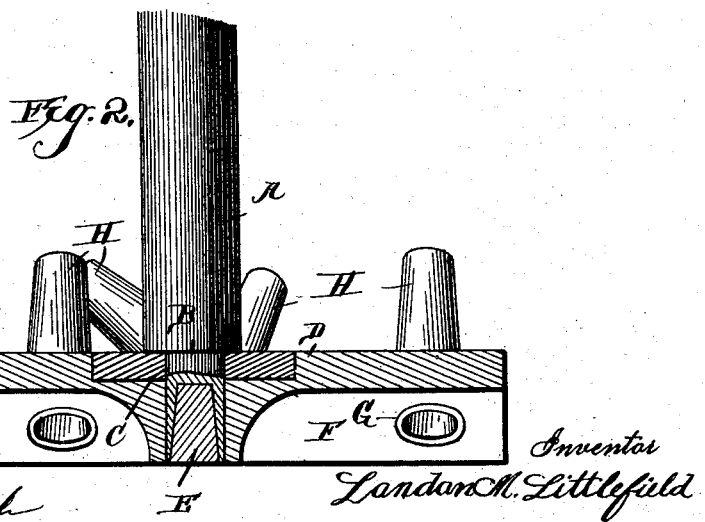
Witnesses
Henry G. Dieterich
R. W. Bishop.
Inventor
Landon M. Littlefield
By his Attorneys

UNITED STATES PATENT OFFICE.

LANDAN M. LITTLEFIELD, OF VALDOSTA, GEORGIA.

CHURN-DASHER.

SPECIFICATION forming part of Letters Patent No. 407,672, dated July 23, 1889.

Application filed March 15, 1889. Serial No. 303,467. (No model.)

*To all whom it may concern:*

Be it known that I, LANDAN M. LITTLEFIELD, a citizen of the United States, residing at Valdosta, in the county of Lowndes and State of Georgia, have invented new and useful Improvements in Churn-Dashers, of which the following is a specification.

My invention relates to improvements in churn-dashers; and it consists in certain novel features, hereinafter described and claimed.

In the accompanying drawings, Figure 1 is a perspective view of a churn-dasher constructed in accordance with my invention. Fig. 2 is a vertical section of the same.

The dasher-rod A may be of any desired size, and is of the usual construction. The lower end of the dasher-rod is provided with a tenon B, which enters central openings C in the intersecting cross-bars D, and is secured therein by having a wedge E driven upward through its lower end, so as to bind the tenon against the sides of said openings. These cross-bars are provided at their centers with grooves or recesses, the walls of each groove engaging the edges of the other cross-bar, so that the said cross-bars will be prevented from turning on each other. In the under sides of the cross-bars, at the ends of the same, I form the longitudinal recesses or channels F, which are concave or beveled in cross-section, and openings G are formed in the cross-bars and lead outward in opposite directions from the opposite sides of said recesses. Tubes H are secured in these openings G, and project upward from the cross-bars, as clearly shown. Inasmuch as the cross-bars intersect and the openings G extend in opposite directions, the tubes H will be arranged in intersecting planes, so that they will cause a thorough agitation of the cream in the operation of the device.

In practice the dasher is reciprocated in the churn-body by any desired mechanism, and produces a thorough agitation of the cream, so as to form the butter. As the dasher is reciprocated, the tubes H, projecting from the cross-bars, serve as cutters to separate the globules of the cream, and also provide an increased surface to act on the cream and agitate the same. Furthermore, on the down-stroke of the dasher the cream will escape through the openings in the cross-bars, and will be formed into streams by the tubes, so as to be thrown to all parts of the churn-body, and consequently maintain a thorough circulation of the liquid.

My device is very simple, and its advantages are thought to be obvious.

I am aware of the patent to Underwood, No. 171,069, and specifically disclaim the construction shown therein. I lay stress on the attachment and arrangement of the tubes, which serve to cut the cream from the milk and bring butter in one-half the time than would be the case with a dasher that did not employ the tubes. The diagonal arrangement of the tubes causes the streams of milk to be thrown in different directions, keeping up a constant whirling action and causing a rapid separation of the butter from the milk.

Having thus described my invention, what I claim, and desire to secure by Letters Patent, is—

The improved churn-dasher herein described and shown, consisting of the intersecting cross-bars secured rigidly together and provided in their under sides with longitudinal concave channels, and having inclined openings extending in opposite directions through the opposite walls of said channels, and the straight tubes secured in said openings and projecting upward above the cross-bars, as set forth.

In testimony that I claim the foregoing as my own I have hereto affixed my signature in presence of two witnesses.

LANDAN M. LITTLEFIELD.

Witnesses:
C. R. ASHLEY,
R. T. MYDDELTON.